United States Patent [19]

Hunter et al.

[11] Patent Number: 5,763,538
[45] Date of Patent: Jun. 9, 1998

[54] PROCESS FOR MAKING AN ORIENTED POLYESTER ARTICLE HAVING IMPROVED HYDROLYTIC STABILITY

[75] Inventors: Raymond Guilford Hunter, Nashville, Tenn.; Donna Lynn Visioli, Lower Gwynedd, Pa.

[73] Assignee: E. I. du Pont de Nemours and Company, Wilmington, Del.

[21] Appl. No.: 736,839

[22] Filed: Oct. 28, 1996

[51] Int. Cl.⁶ ........................................... C08L 67/02
[52] U.S. Cl. ............................... 525/440; 525/437
[58] Field of Search .............................. 525/437, 440

[56] References Cited

U.S. PATENT DOCUMENTS 2,895,946  7/1959  Huffman ........................ 260/75
2,905,657  9/1959  Huffman ........................ 260/75
4,929,714  5/1990  Trotter et al. ................. 528/272

FOREIGN PATENT DOCUMENTS 3-069294   10/1991  Japan.
WO 83/01253  4/1983  WIPO.

Primary Examiner—Patricia A. Short

[57] ABSTRACT

Process for making an oriented polyester article with improved hydrolytic stability involves blending a polyester resin with (a) polyalkylene glycol which may be alkoxy end capped and (b) optionally a further compound of glycidyl ether carbodiimide, keteneimines, aziridines or isocyanate, heating to form a melt and forming the melt into an oriented article.

8 Claims, No Drawings

PROCESS FOR MAKING AN ORIENTED POLYESTER ARTICLE HAVING IMPROVED HYDROLYTIC STABILITY

FIELD OF THE INVENTION

This invention relates to a process for making an oriented polyester article having improved hydrolytic stability.

BACKGROUND OF THE INVENTION

Polyester resins have long been used in the production of oriented articles, such as monofilaments, fibers, films, and molded parts and containers. The resins, and the articles made from them, have generally good physical properties. However, it is known that most polyesters exhibit some degree of hydrolytic instability when subjected to heat in a wet atmosphere. Under these conditions, the polyester materials can suffer moderate to severe loss of physical properties due to degradation of the polymer chains.

One example of this degradation problem occurs when polyester monofilaments are used in woven fabrics for paper-making machines. The fabrics are used as filters and as belts for conveying the wood pulp slurry through dryer sections. Under these conditions, hydrolytic degradation can take place, thereby severely limiting the useful life of the fabric.

It is known to improve the hydrolytic stability of polyester fiber by reacting the polyester with epoxy compounds, as disclosed in, e.g., Korver, U.S. Pat. No. 4,071,504, East German published application DD 249485, and Japanese published application JP 57161124. However, the reaction of the epoxides with the polyester is known to be slow and adversely affect productivity. Bhatt, in published International application WO 83/1253, discloses that the hydrolytic stability of polyester monofilaments can be improved by the addition of certain polyester stabilizers preblended in an additional thermoplastic material. The preferred stabilizer is a carbodiimide. However, it is frequently undesirable to add materials such as carbodiimides because of their high toxicity and expense. Furthermore, the thermoplastic material in which the stabilizer is blended may adversely affect other properties of the polyester article.

There exists a needs, therefore, for a process for producing an oriented polyester article with improved hydrolytic stability, which is fast and does not adversely affect other properties.

SUMMARY OF THE INVENTION

This invention provides a process for making an oriented polyester article having improved hydrolytic stability, said process comprising:
 (a) blending a polyester resin with
  (i) 0.00005–0.03 mole %, based on the weight of the polyester resin, of a first compound selected from the group consisting of polyalkylene glycol, alkoxy end-capped polyalkylene glycol, and mixtures thereof, and
  (ii) 0–3 weight %, based on the weight of the polyester resin, of a second compound selected from the group consisting of glycidyl ethers, carbodiimides, keteneimines, aziridines and isocyanates, to form a blended polyester;
 (b) heating the blended polyester from step (a) to form a melt; and
 (c) forming the melt from step (b) into an oriented article wherein steps (a) and (b) can be carried out simultaneously.

DETAILED DESCRIPTION OF THE INVENTION

Materials

The polyester resins useful in the present invention include those thermoplastic polyester resins which can be readily extruded to form monofilaments, fibers, films or molded articles. Such polyesters are derived from an aromatic diacid and a glycol. Examples of suitable aromatic diacids include terephthalic, isophthalic and naphthalaic dicarboxylic acid, or combinations thereof. Examples of suitable glycols include alkane diols of 2–8 carbon atoms which may be further substituted with ethyl, methyl or butyl groups, cyclohexane diols, and the like.

Examples of suitable polyesters include polyethylene terephthalate (PET), polybutylene terephthalate (PBT), polyethylene naphthalate (PEN), copolymers of PET, copolymers of PBT and copolymers of PEN. A preferred polyester resin is PET.

The polyesters and copolyesters can be produced using conventional polyesterification procedures which are well known in the art. They can be formed by direct esterification of the acid, or by ester exchange with the esters of the acids, e.g., PET may be formed from ethylene glycol by direct esterification with terephthalic acid, or by ester exchange between ethylene glycol and dimethyl terephthalate. It is desirable in the present invention for the intrinsic viscosity (I.V.) of the polyester to be high, i.e., in the range of about 0.58 to 1.1, preferably 0.8 to 0.95. Preferably, the high I.V.s are attained by melt phase polymerization which can be followed by conventional solid state polymerization.

The first compound which is added to improve the hydrolytic stability of the polyester, is a polyalkylene glycol or an alkoxy end-capped polyalkylene glycol. It was surprising and unexpected that these hydrophilic, frequently water soluble, compounds would increase the hydrolytic stability of the polyester. The compounds have the formula:

where R is hydrogen or alkyl of 1–5 carbon atoms, n is a number from 2–5, and x is at least 3. The weight average molecular weights of these compounds are generally in the range of 200 to 20,000; preferably 300 to 8000. Examples of suitable first compounds include polyethylene glycol, methoxy and ethoxy end-capped polyethylene glycol, polypropylene glycol, methoxy and ethoxy end-capped polypropylene glycol. A preferred first compound is methoxy end-capped polyethylene glycol having a molecular weight of 2000–8000.

The first compound is added in an amount of about 0.00005–0.03 mole %, based on the weight of the polyester resin. Mole % here is defined as the number of moles of compound per gram of polyester resin times 100. Preferably the amount of compound is 0.0001–0.003 mole %.

The amount of first compound added can also be determined based on the number of residual acid groups in the polyester. Typically, the amount of first compound is 0.01 to 30 millimoles (mmoles) per milli-equivalent (meq) of carboxyl group. Preferably, the amount of first compound is 0.03 to 10 mmoles/meq COOH.

It is sometimes desirable to add a second compound to the polyester resin to improve the hydrolytic stability. Examples of types of compounds which can be added include glycidyl ethers, carbodiimides, keteneimines, aziridines and isocyanates. A preferred second compound is polycarbodiimide.

The second compound is added in an amount of 0 to about 3 weight % (wt %), based on the weight of the polyester resin. Preferably less than about 1 wt % of the second compound is added.

Other conventional additives for polyester resins can be present in the blended composition. Such additives include stabilizer and inhibitors of oxidative, thermal, and ultraviolet light degradation; lubricants and mold release agents, colorants including dyes and pigments; particulate fillers; nucleating agents, etc.

Process

In the process of the invention, the first compound, and optionally the second compound, are blended with the polyester resin which has already been polymerized, to form a blended polyester. The blended polyester is then heated to form a melt, and the melt is formed into the desired final product, i.e., fiber or film.

The polyester resin can be in the form of pellets, flake, or it can be molten. The first compound and optional second compound can be in the form of a liquid or a solid. The blending of the resin and the compound(s) can be accomplished by a variety of methods which are well-known in the art.

The blending can be accomplished by melt blending in a closed system. This can be accomplished in high shear equipment or conventional single- or multi-screw extruders at a temperature sufficient to cause the resin to melt flow. For example, the blending can be carried out in a multi-screw extruder, such as a Werner Pfleiderer extruder having generally 2–5 kneading blocks and at least one reverse pitch to generate high shear. Alternatively, other conventional plasticating devices such as a Brabender, Banbury mill, or the like, can be used. In the most preferred embodiment, the mixing temperature should be less than about 280° C., more preferably less than about 265° C.

Alternatively, the blending can be accomplished by dry mixing together of the resin and compound(s), or by mixing the dry resin with liquid compound(s). This can be carried out in conventional devices for blending, such as those listed above, rotary blenders and other agitating devices. The resin and compound can be tumble blended and fed to a plasticating device such as an extruder; or the compound, whether liquid, molten solid or powder, can be fed separately to the device.

Alternatively, the compound(s) can be added to the polyester immediately after polymerization and before pelletization by injecting the compound(s) into the polyester melt stream with appropriate mixing.

The blended polyester can be formed into pellets, prior to steps (b) and (c) of the process. This is usually accomplished by feeding the blend into a device such as a multi-screw extruder, heating and extruding to form pellets.

Alternatively, mixing of the resin and first compound can be carried out in the same device, i.e., an extruder, which is used to make the final article.

In some cases the addition of the first compound to the polyester resin, may cause a reduction in the molecular weight of the polyester resin, as evidenced by a decrease in viscosity. It was found that the molecular weight can be increased by solid state polymerization of the blended polyester resin. Solid state polymerization processes are well known for increasing the molecular weight of condensation polymers. Solid polymer particles are heated above the glass transition temperature of the polymer but below the melting point. This is done under vacuum or flow of inert gas, such as nitrogen, to remove the by-products of the condensation reaction.

While not wishing to be bound by any theory, it is felt that the first compound reacts with the functional end groups of the polyester polymer, as evidenced by the lower carboxyl number. It was therefore surprising and unexpected that the molecular weight of the blended polyester resin could be increased by solid state polymerization, since it is generally held that the functional end groups of the polymer must be uncapped in order for solid state polymerization to take place. Clearly there are complex mechanisms at work which result in the improved hydrolysis resistance.

In step (b) of the process, the blended polyester is heated to form a melt. This can be accomplished simultaneously with the blending step, particularly when the blending step is carried out in an extruder. Alternatively, the heating step can be separate from the blending step. The heating can take place in an extruder, or other conventional mixing device. The temperature should be sufficient to cause the polyester blend to melt flow. As in the blending step, it is preferred that the temperature in the heating step should be less than about 270° C., more preferably less than about 265° C.

In step (c), the polyester melt is formed into an oriented article. Such processes are well known in the art, and include conventional extrusion processes. It is well known in the art to form polyester monofilaments by extruding polymer melt through a monofilament dye. The extruded material is then quenched, taken up and drawn.

It is well known in the art to form polyester fiber by melt spinning. In general, molten polymer is fed vertically to a spinneret, drawn down and quenched with air, and converged to form a multifilament fiber.

Similarly, it is well known in the art to form a polyester film by melt extrusion with various degrees of uniaxial or biaxial orientation. The polyester melt is extruded through an extruder and the extrudate is quenched, or cooled, to obtain a nonoriented, substantially amorphous polyester sheet. Heat treatment results in increased crystallinity. Generally, stretching treatments are applied, first in the longitudinal direction and then, optionally, in the transverse direction. Finally, an annealing treatment is applied to the oriented film.

It is well know in the art to form polyester parts and containers by molding. Such processes include casting, pressure molding, injection molding, extrusion molding, injection-stretch blow molding and extrusion blow molding. Optionally these molding processes can include a heat treatment step for stabilization.

For extrusion processes, it is preferred that the extrusion temperature of the final material should be less than about 280° C., more preferably less than about 260° C.

The oriented polyester articles made according to the present invention exhibit increased hydrolytic stability, compared to articles made from unmodified polyester. The fibers and films of the invention have increased retention of tensile strength after hydrolysis. They have a smaller increase in carboxyl number and a smaller decrease in molecular weight after hydrolysis.

The process of the invention is illustrated, but not limited by the following examples. Unless otherwise noted, all molecular weights are weight average molecular weights; all percentages are by weight.

EXAMPLES

General Procedure

PET resin (Crystar® 1995, made by E. I. du Pont de Nemours and Company, Wilmington, Del.) was dried at 150° C. in a vacuum oven for 4 hours, then at 80° C. for 16 hours. When a carbodiimide or polycarbodiimide was added as the second compound, it was first tumble blended with the resin in a closed container at room temperature. Suitable second compounds include Stabaxol® P, Stabaxol® I and Stabaxol® P100 (Rhein Chemie, Trenton, N.J.). The first compound was then added to the container and tumble blended also for about 5 minutes. The material was then compounded in a 28 mm twin screw extruder (Werner and Pfleiderer, Ramsey, N.J.) having the following temperature profile:

feed throat: cold
zone 1: 160° C.
zone 2: 275° C.
zone 3: 275° C.
zone 4: 275° C.
zone 5: 270° C.
adapter: 270° C.
die: 270° C.

The material was extruded to form pellets, which were produced at the rate of 10 lb/hr (22 kg/hr). The compounded pellets were dried in a vacuum oven at 85° C. for 16 hours.

Strand was produced from the dried pellets using a 28 mm single-screw extruder (Killion Extruders, Inc., Cedar Grove, N.J.) with a 1.0 mm diameter die. The extruder temperature profile was:

| rear | 270° C. |
| center | 265° C. |
| front | 265° C. |
| flange/die | 265° C. |

The strand was pulled through the adapter iris of the water tank and placed between puller rolls. The puller speed was adjusted to achieve the required outer diameter and wound onto a core. The strand was then stretched between two rolls in a heated chamber (shoe) at 100° C. (Fourne Draw Unit) to 5 times its original length, to form filament. Any samples which broke before being drawn 5× were described as being undrawable (UD).

To hydrolyze a sample, a filament sample, approximately 2 grams, was rolled and tied with a string to a support rack. This was suspended over a pot containing about 4 liters deionized water in a steam sterilizer (All American Electric Pressure Steam Sterilizer Model 25X, made by Wisconsin Aluminum Foundry Co., Inc., Manitowoc, Wis.) equipped with a temperature controller (Omega Engineering, Inc., Stamford, Conn.). The top of the sterilizer was sealed and the heat set to 120° C. The vent valve was left open during the heatup time. Steam was allowed to escape from the valve for 7 minutes to purge air from the system. The vent valve was then closed and the temperature was regulated to reach and maintain 15 psi (0.1 MPa) on an Ashcroft gauge (Dresser Industries, Dallas, Tex.), generally 118°–120° C. The samples were left in the sterilizer vessel for 72 hours under these conditions. The heat was then turned off and the vessel allowed to cool. When the pressure was reduced to atmospheric pressure, the valve was opened and the samples were removed.

Tensile strength was measured using a Syntech Computerized System for Material Testing (Syntech, Stoughton, Mass.). The procedure used was ASTM D-638, with the mounting method modified for fibers or films. The monofilament samples were mounted as described in ASTM D-2256; the film samples were mounted as described in ASTM D-882.

Carboxyl number was measured by titration. The polymer samples were added to o-cresol and heated below 100° C. until dissolved. They were titrated using a solution of KOH in methanol to the neutralization end point of the acid groups. Results are reported as milli-equivalents of carboxylic acid groups per kilogram of resin.

Laboratory Relative Viscosity (LRV) was measured as the ratio of the absolute viscosity of a polymer solution to the absolute viscosity of the solvent. The methodology used was based on ASTM 2857-70 using a single solvent system for sample dissolution. The solution viscosity of a 4.75% (wt/wt) solution of polymer in hexafluoroisopropanol was measured using a calibrated Cannon-Fenske viscometer.

Examples 1–4

These examples illustrate the improved hydrolytic stability of monofilament samples made according to the invention, with or without the addition of the second compound. In all cases the second compound was Stabaxol® P.

Monofilament samples were prepared according to the general procedure with the compositions given below. The mmol % is the mole % times 1000. MPEG 5000 stands for methoxy end-capped polyethylene glycol having a weight average molecular weight of 5000. C1–C3 are controls.

| | Compound 1 | | | Compound 2 |
|---|---|---|---|---|
| Ex. | Type | wt % | mmol % | wt % |
| C1 | none | 0 | 0 | 0 |
| C2 | none | 0 | 0 | 0.75 |
| C3 | none | 0 | 0 | 1.5 |
| 1 | MPEG 5000 | 1.0 | 0.2 | 0 |
| 2 | MPEG 5000 | 1.0 | 0.2 | 0.75 |
| 3 | MPEG 5000 | 1.0 | 0.2 | 1.5 |
| 4 | MPEG 5000 | 1.5 | 0.3 | 0.75 |

The monofilaments were subjected to hydrolysis as described in the general procedure. The tensile strength, carboxyl number and LRV were measured before hydrolysis ("BH") and after hydrolysis ("AH"). The "% tensile retained" is the tensile strength after hydrolysis as a percentage of the initial tensile strength.

| | % Tensile | LRV | | Carboxyl | |
|---|---|---|---|---|---|
| Ex. | Retained | BH | AH | BH | AH |
| C1 | 0 | 39.9 | 7.9 | 13.1 | 73.7 |
| C2 | 74 | 35.5 | 7.2 | 11.4 | 101.5 |
| C3 | 71 | 31.1 | 12.4 | 1.8 | 44.1 |
| 1 | 69 | 30.8 | 17.4 | 1.4 | 6.6 |
| 2 | 70 | 30.7 | 10 | 0.5 | 27.7 |
| 3 | 79 | 34.7 | 28.4 | 0.3 | 3.6 |
| 4 | 76 | 33.8 | 24.7 | 3 | 11.5 |

Examples 5–14

These examples illustrate the improved hydrolytic stability of monofilaments made according to the present invention using different first compounds. PEG is polyethylene glycol. The number after "PEG" or "MPEG" indicates the weight average molecular weight.

| | Compound 1 | | Compound 2 |
|---|---|---|---|
| Ex. Type | wt % | mmol % | wt % |
| C1 none | 0 | 0 | 0 |
| C2 none | 0 | 0 | 0.75 |
| 5 PEG 300 | 1.0 | 3.3 | 0.75 |
| 6 PEG 300 | 5.0 | 16.7 | 0.75 |
| 7 PEG 4600 | 0.5 | 0.11 | 0.75 |
| 8 PEG 4600 | 1.0 | 0.22 | 0.75 |
| 9 PEG 8000 | 1.0 | 0.13 | 0.75 |
| 10 MPEG 350 | 0.1 | 0.29 | 0.75 |
| 11 MPEG 350 | 1.0 | 2.9 | 0.75 |
| 12 MPEG 350 | 5.0 | 14.3 | 0.75 |
| 13 MPEG 2000 | 1.0 | 0.5 | 0.75 |
| 14 MPEG 10000 | 1.0 | 0.1 | 0.75 |

The monofilaments were subjected to hydrolysis as described in the general procedure.

| | % Tensile | LRV | | Carboxyl | |
|---|---|---|---|---|---|
| Ex. | Retained | BH | AH | BH | AH |
| C1 | 0 | 39.9 | 7.9 | 13.1 | 73.7 |
| C2 | 74 | 35.5 | 7.2 | 11.4 | 101.5 |
| 5 | 83 | 22.5 | 8 | 2.9 | 59 |
| 6 | UD(a) | 7.1 | 5.4 | 7.3 | 64.1 |
| 7 | 78 | 35.9 | 27.6 | 0 | 4.5 |
| 8 | 100 | 31.6 | 10.3 | 0.5 | 29.7 |
| 9 | 77 | 31.9 | 8.2 | 0.7 | 15.8 |
| 10 | 45 | 30.8 | 24.5 | 6.8 | 8.1 |
| 11 | 93 | 19.1 | 7.2 | 1.5 | 53 |
| 12 | UD(a) | 10 | 6.5 | 2.3 | 46 |
| 13 | 84 | 27.6 | 7.6 | 6.1 | 40.6 |
| 14 | 53 | 35.2 | 24.1 | 1.2 | 2.5 |

(a)UD = undrawable

Examples 6 and 12 could not be spun into filaments due to low initial LRV. This can be corrected by solid state polymerization of the polyester blend subsequent to addition of the first compound.

Example 15

This example illustrates the improved hydrolytic stability of films prepared according to the process of the invention.

Compounded pellets prepared as described in the general procedure, or control pellets of polyester resin, were extrusion cast into 5 mil (126 μm) sheets. Oriented film sheets were prepared in a laboratory stretcher by stretching 3.5× in both the machine and transverse directions at 85° C. The films were then heat set at 210° C. The films were hydrolyzed by immersing in boiling water for 500 hours.

The film made with polyester containing 1 wt % MPEG 5000 had tensile strength retention of 80%. The control film made with Crystar® 1995 had tensile strength retention of 30%.

Example 16

This example illustrates that the molecular weight of the polyester can be increase by solid state polymerization after the addition of the first compound.

Control 15-C1: Crystar® 1995 resin was formed into monofilaments according to the general procedure.

Control 15-C2: A low molecular weight (as indicated by LRV) polyethylene terephthalate resin was prepared by the transesterification of dimethyl terephthalate with ethylene glycol using conventional techniques. The resin was formed into pellets. Monofilaments were prepared as described in the general procedure.

Sample 15-1: The low molecular weight resin was prepared as described for 15-C2 above. MPEG 5000 was added with appropriate mixing at the end of the melt stream prior to pelletization. Monofilaments were prepared as described in the general procedure.

Sample 15-2: The pellets containing MPEG 5000 were subjected to solid state polymerization by tumble drying for 24 hours at 220° C. under vacuum. Monofilaments were prepared as described in the general procedure.

Sample 15-3: Pellets of Crystar® 1995 resin were blended with MPEG 5000 and formed into monofilaments as described in Example 1.

| | | LRV | | Carboxyl | | % Ten. |
|---|---|---|---|---|---|---|
| Ex. | % MPEG | BH | AH | BH | AH | Ret. |
| 15-C1 | 0 | 39.9 | 7.9 | 13.1 | 73.7 | 0 |
| 15-C2 | 0 | 20.6 | | | | |
| 15-1 | 1 | 17.9 | 10.6 | 11.1 | 16.2 | 74 |
| 15-2 | 1 | 26.8 | 15.9 | 7.4 | 12 | 72 |
| 15-3 | 1 | 30.8 | 17.4 | 1.4 | 6.6 | 69 |

The properties of the monofilament made from the lower molecular weight PET with MPEG 5000 subjected to solid state polymerization (Sample 15-2) are very similar to those of the monofilament formed from MPEG blended with higher molecular weight PET (Sample 15-3).

What is claimed is:

1. A process for making an oriented polyester article having improved hydrolytic stability, said process comprising:
   (a) blending a polyester resin with
      (i) 0.00005–0.03 mole %, based on the weight of the polyester resin, of a first compound of alkoxy end-capped polyalkylene glycol, and
      (ii) 0–3 weight %, based on the weight of the polyester resin, of a second compound selected from the group consisting of glycidyl ethers, carbodiimides, keteneimines, aziridines and isocyanates, to form a blended polyester;
   (b) heating the blended polyester from step (a) to form a melt; and
   (c) forming the melt from step (b) into an oriented article wherein steps (a) and (b) can be carried out simultaneously.

2. The process of claim 1 wherein the polyester is polyethylene terephthalate.

3. The process of claim 1 wherein the first compound has a weight average molecular weight in the range of 200–20,000.

4. The process of claim 3 wherein the molecular weight is in the range of 300 to 8,000.

5. The process of claim 1 wherein the first compound is methoxy end-capped polyethylene glycol.

6. The process of claim 1 wherein the second compound is a polycarbodiimide.

7. The process of claim 1 wherein the polyester is polyethylene terephthalate and wherein the first compound is methoxy end-capped polyethylene glycol having a weight average molecular weight in the range of 300 to 8000.

8. A process for making an oriented polyester article having improved hydrolytic stability, said process comprising:
(a) blending a polyester resin with
  (i) 0.00005–0.03 mole %, based on the weight of the polyester resin, of a first compound selected from the group consisting of polyalkylene glycol, alkoxy end-capped polyalkylene glycol, and mixtures thereof, and
  (ii) 0–3 weight %, based on the weight of the polyester resin, of a second compound selected from the group consisting of glycidyl ethers, carbodiimides, keteneimines, aziridines and isocyanates, to form a blended polyester;
(b) heating the blended polyester from step (a) to form a melt; and
(c) forming the melt form step (b) into an oriented monofilament wherein steps (a) and (b) can be carried out simultaneously.

* * * * *